United States Patent [19]

Stahl, Jr.

[11] 4,063,646
[45] Dec. 20, 1977

[54] LATCHED ROD RACK

[75] Inventor: Otto Stahl, Jr., Annandale, N.J.

[73] Assignee: National Manufacturing Company, Chatham, N.J.

[21] Appl. No.: 641,273

[22] Filed: Dec. 16, 1975

[51] Int. Cl.² ............................................. A47F 7/00
[52] U.S. Cl. .......................................... 211/4; 70/58;
211/60 R; 224/42.1 F; 248/203
[58] Field of Search ................................. 211/4, 7-9,
211/60, 61-69, 125; 248/203; 70/57, 58, 66, 59,
60, 61; 224/45, 42.1, 1 R, 29 R, 29 G, 29 L, 42.1
R, 42.1 B, 42.1 C, 42.1 D, 42.1 E, 42.1 F, 42.1
G, 42.1 H, 42.38, 42.45 R, 42.46 R; 312/244;
43/26; 280/11.37 R, 11.37 A, 11.37 K, 11.37 C

[56] References Cited

U.S. PATENT DOCUMENTS

| | | | |
|---|---|---|---|
| 1,233,576 | 7/1917 | Higgins | 211/8 X |
| 2,007,224 | 7/1935 | Stoekle | 211/60 A |
| 2,097,939 | 11/1937 | Timm | 211/64 X |
| 2,650,449 | 9/1953 | Suring | 43/26 |
| 2,710,732 | 6/1955 | Peters | 70/58 X |
| 2,788,928 | 4/1957 | Des Fosses | 224/42.1 G |
| 2,999,378 | 9/1961 | Blair | 70/58 |
| 3,081,056 | 3/1963 | Young et al. | 248/203 |
| 3,242,704 | 3/1966 | Barreca | 70/58 |
| 3,376,614 | 4/1968 | Stahl, Jr. | 211/60 X |
| 3,537,595 | 11/1970 | Mathisen | 211/60 R |
| 3,568,902 | 3/1971 | Highberger | 224/45 |
| 3,690,130 | 9/1972 | Eutzler | 211/4 X |

FOREIGN PATENT DOCUMENTS

432,271  3/1948  Italy .................. 224/42.1 F

Primary Examiner—Roy D. Frazier
Assistant Examiner—Terrell P. Lewis
Attorney, Agent, or Firm—Albert F. Kronman

[57] ABSTRACT

A fixed fishing rod receiving member is provided with an opposed latch member swingably secured thereto. Spaced hookshaped extensions on the rod receiving member underlie the rods and spaced pins extending toward the rod receiving member and carried by the latch member overlie the rods. A block of resilient material is carried between the hooks and the pins to grasp and cushion the rods within the rack when closed. Lock means are provided to secure the rods in place within the device.

5 Claims, 6 Drawing Figures

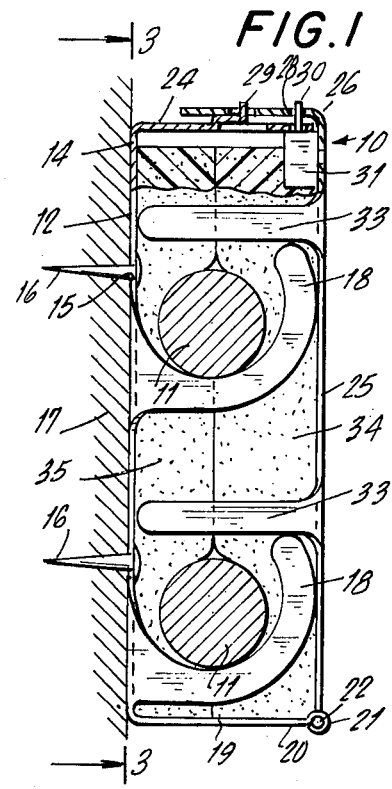

LATCHED ROD RACK

BACKGROUND OF THE INVENTION

Fishing rod racks consisting of a plurality of wall mounted outwardly extending spaced pins are well-known. The pins are often angularly disposed to prevent the rods from rolling off. Alternately the pins may be hook shaped to retain the rods. Such devices do not permit the rods to be locked in place to prevent unpermitted withdrawal. In addition, when used in a moving vehicle, such as an automobile or boat, the rods can become damaged by frictional contact with the pins.

Accordingly, it is an object of the present invention to provide a fishing rod rack which will retain the rods in a secure protected manner when not in use.

Another object of the present invention is to permit ready access to the rods when the device is unlatched.

Still another object of the present invention is to prevent unpermitted withdrawal of the rods within the rack.

A feature of the present invention is its simplified, relatively inexpensive construction.

SUMMARY OF THE INVENTION

The rod rack according to the present invention consists of an elongated rod receiving member having a flat back plate for attachment to a wall or vertical surface, a plurality of spaced hook-like members extending outwardly from the vertical margins of the back plate and an outwardly extending tab at the top and bottom of the back plate to receive a latching member.

The latching member is hingedly secured to the bottom tab of the back plate and is coupled to the top tab. A plurality of spaced pins extend from a swingable elongated plate of the latching member and are integral with the elongated margins thereof. The pins are disposed between the hook like members when the rack is closed.

An elongated block of resilient material is carried between the hooks on the rod receiving member and a second resilient block is carried between the pins. The elongated blocks secure and cushion the rods therebetween when the rack is closed.

BRIEF DESCRIPTION OF THE DRAWING

In the accompanying drawing forming part hereof, there is illustrated three embodiments of the present invention, in which drawing similar reference characters designate corresponding parts and in which:

FIG. 1 is a view in side elevation, partly broken away, of a complete embodiment of the present invention.

FIG. 2 is a view similar to FIG. 1 in the unlatched position.

FIG. 3 is a rear view taken on line 3—3 in FIG. 1 looking in the direction of the arrows.

FIG. 4 is a view similar to FIG. 1 showing a second embodiment of the present invention.

FIG. 5 is a view in side elevation, partly broken away showing a third embodiment.

FIG. 6 is a view taken on line 6—6 in FIG. 5.

GENERAL DESCRIPTION

Referring to the drawing and particulary to FIGS. 1-3, 10 indicates a rod rack suitable for holding fishing rods 11. The rod rack consists of an elongated rod receiving member 12 and a latching member 13.

The rod receiving member is made of a suitable rigid material such as flat steel plate and its structure lends itself to economical stamping fabrication processes. A flat back plate 14 on the rod receiving member is provided with openings 15 to receive nails or screws 16 to secure the device to a wall 17 or other vertical surface.

A series of spaced hook-like elements 18 (hereinafter, hooks) are formed along each of the longer or vertical margins of the back plate 14 and are preferably made integral therewith as by a stamping operation. Alternately, the hooks 18 may be secured to the back plate by welding. The hooks are disposed at right angles to the back plate in parallel orientation. While only two pairs of hooks 18 have been shown, by way of illustration, the invention is not to be limited to any specific number of hooks 18. One or more rod racks may also be used in spaced relationship to support long or very flexible rods.

A first tab 19 is formed at the bottom of the back plate 14 as by bending a portion of the said plate to a position normal to the plane of the plate, as shown in FIGS. 1 and 2. The free end 20 of the tab 19 is rolled as indicated at 21 to receive a hinge pin 22 freely carried therein. The hinge pin is journaled within a small hinge barrel 23, hereinafter more fully described.

A portion of the upper end of the back plate 14 is also bent at right angles to form a second tab 24 parallel to but spaced from the first tab 19. The second tab serves as a coupling element for the latching member 13.

The latching member 13 is formed from the same rigid material as the rod receiving member 12 and is of a simplified structure such as lends itself to stamping fabrication. A flat plate 25 (hereinafter called the "front plate") somewhat similar in dimensions to the back plate 14 forms the main portion of the latching member. The bottom of the front plate is rolled and notched to form the hinge barrel 23 so that the latch member can swing freely upon the hinge pin 22.

An inwardly bent latching tab 26, which is an extension of the front plate 25 bent normal to itself, is provided at the top of the latching member 13. The latching tab 26 is provided with two opening 27, 28. Opening 27 is adapted to receive a small detent 29 on the top of the second tab 24.

The detent 29 may be struck from the top of the second tab 24 and is of a size that the latching tab 26 will snap over the top of it as the latching member is brought into the closed position and the detent 29 comes into register with the opening 27. The second opening 28 is positioned to lie directly over the bolt 30 of a small lock 31 carried by the front plate 25. When the bolt 30 is advanced by means of a key 32 it enters the opening 28 and secures the latching member to the rod receiving member.

A series of spaced pins 33 integral with the front plate 25 and extending in the direction of the back plate 14 are provided along the vertical margins of the front plate 25. In the closed position, the pins 33 overlie the hooks 18 and the rods 11 placed within the rack. The pins 33 also serve as lateral supports for a resilient block 34. The resilient block may be made of sponge rubber, neoprene, or any of the well known foamed plastic materials. A second resilient block 35 is provided on the rod receiving member and is laterally supported between the hooks 18. The resilient blocks 34, 35 may also be cemented to the front and back plates respectively by means of any suitable adhesive.

By reason of the resiliency of the blocks 34, 35 they will surround the rods 11 placed in the rack when the latching member is brought into place as shown in FIG. 1. This construction, prevents unwanted movement of the rods within the rack and protects them from frictional contact with the structure of the device.

Referring to FIG. 4 there is shown a second embodiment of the present invention in which the detent 36 is provided with a bead 37 to receive a complimentary bead 38 on the latching plate tab 26. The tab 26 has sufficient spring to secure the latching member to the rod receiving member while a lock 31 is provided to more permanently hold them together.

The embodiment shown in FIGS. 4 and 5 differs from the rod rack in FIGS. 1 – 3 in that the back plate 14 is not bent over to form the second tab 24 but extended to receive a lock 39. The latching tab 26 is of a length which will slip through a slot 40 in the back plate. An opening 41 in the tab 26 spaced from the free end thereof receives the end of the lock bolt 30 when the rod rack is locked.

From the foregoing it will be seen that there have been provided latching rod racks of simplified structure, capable of manufacture by metal stamping and bending operations and with latching and locking features.

Having thus fully described the invention, what is claimed and desired to be secured by letters patent is:

1. A fishing rod holder comprising a rod receiving member, a substantially flat elongated back plate on the rod receiving member, a plurality of spaced rod receiving hooks on said back plate struck from said back plate and extending normally from the lateral margins of the back plate, a first block of resilient material on the back plate and disposed between the hooks, a latching member swingably secured to the rod receiving member, a substantially flat elongated front plate on the latching member, a plurality of spaced pins on said front plate and extending from the lateral margins of the front plate in the direction of the back plate, a second block of resilient material on the front plate and disposed between the pins in cooperative relationship with the first block to receive the fishing rods therebetween, latching means to yieldably hold the rod receiving and latching members together and a lock to secure the said latching member to the rod receiving member.

2. A device according to claim 1 in which the hooks and pins are disposed in the same plane on each side of the back and front plates and the pins each overlie an adjacent hook when the device is in the rod retaining position.

3. A device according to claim 2 in which the hooks and pins are integral with the back plate and front plates respectively and form lateral supports for the first and second resilient blocks.

4. A device according to claim 1 in which the back plate is formed with a first and a second tab, integral therewith and extending in the direction of the latching member, said first tab terminating in a swingable securing means for the latching member at the free end of said tab.

5. A device according to claim 4 in which the second tab includes a latching means and the front plate is formed with a latching tab engagable with the said latching means, and the lock is carried by the front plate.

* * * * *